US012712851B1

(12) United States Patent
Addepalli

(10) Patent No.: US 12,712,851 B1
(45) Date of Patent: Aug. 18, 2026

(54) MAINTAINING ISOLATION OF CLIENTS OF A SERVICE WITH CONNECTIONLESS PROTOCOLS

(71) Applicant: Amazon Technologies, Inc., Seattle, WA (US)

(72) Inventor: Meher Aditya Kumar Addepalli, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 111 days.

(21) Appl. No.: 18/750,938

(22) Filed: Jun. 21, 2024

(51) Int. Cl.
*H04L 9/40* (2022.01)
*H04L 69/167* (2022.01)

(52) U.S. Cl.
CPC ........ *H04L 63/0272* (2013.01); *H04L 69/167* (2013.01)

(58) Field of Classification Search
CPC .......................... H04L 63/0272; H04L 69/167
See application file for complete search history.

(56) References Cited

U.S. PATENT DOCUMENTS 5,898,830 A * 4/1999 Wesinger, Jr ........... H04L 69/16 709/227
5,915,087 A * 6/1999 Hammond .......... H04L 63/1408 726/12
6,330,242 B1 * 12/2001 Ogawa .................. H04L 69/168 370/395.52
7,908,651 B2 3/2011 Maher
2002/0120760 A1 * 8/2002 Kimchi ............... H04L 65/1043 709/227
2013/0058346 A1 * 3/2013 Sridharan ............ H04L 45/586 370/392
2016/0080261 A1 * 3/2016 Koponen ............... H04L 45/72 370/392
2021/0036953 A1 2/2021 Menon et al.
2024/0179117 A1 * 5/2024 Zhou ....................... H04L 61/58
2025/0007827 A1 * 1/2025 Menon .................... H04L 45/74

* cited by examiner

*Primary Examiner* — Mohamed A. Wasel
(74) *Attorney, Agent, or Firm* — Scott Foster; Kowert, Hood, Munyon, Rankin & Goetzel, P.C.

(57) ABSTRACT

Systems and methods for configuring a routing device to support routing of connectionless packets are described. Upon receiving a connectionless packet, the routing device establishes a flow between the packet source and a target device for a virtual target address. After a period of inactivity in the flow, the flow is removed. To establish the flow, the routing device constructs an intermediate address for the routing device including a prefix for the routing device and an identifier based on the source address, then creates entries in a routing table to support routing of connectionless packets of the flow. The identifier uniquely associates the intermediate address of the particular flow to the source address such that the intermediate address cannot be reused in a future flow established for a difference source. Thus, late-arriving packets of the flow received after removal of the flow cannot be routed to an incorrect target address.

20 Claims, 9 Drawing Sheets dynamic flow1 (port xxxx) 220
client1 device 210
client2 device 211
routing device 110
router IP 200
target device 130 client1 device 210
client2 device 211
routing device 110
router IP 200
target device 130 dynamic flow2 (port xxxx) 221
client1 device 210
client2 device 211
routing device 110
router IP 200
target device 130 dynamic flow2 (port xxxx) 221
client1 device 210
client2 device 211
routing device 110
router IP 200
target device 130

| route table 140 | |
|---|---|
| key 300 | value 310 |
| <source addr+port, virtual target addr+port, UDP> | <intermediate addr+port, target addr+port, UDP> |
| <intermediate addr+port, target addr+port, UDP> | <source addr+port, virtual target addr+port, UDP> |

*FIG. 3*

| intermediate IPv6 routing address 400 | | |
|---|---|---|
| routable prefix 410 | routing address type flags 420 | source-specific suffix 430 |

*FIG. 4*

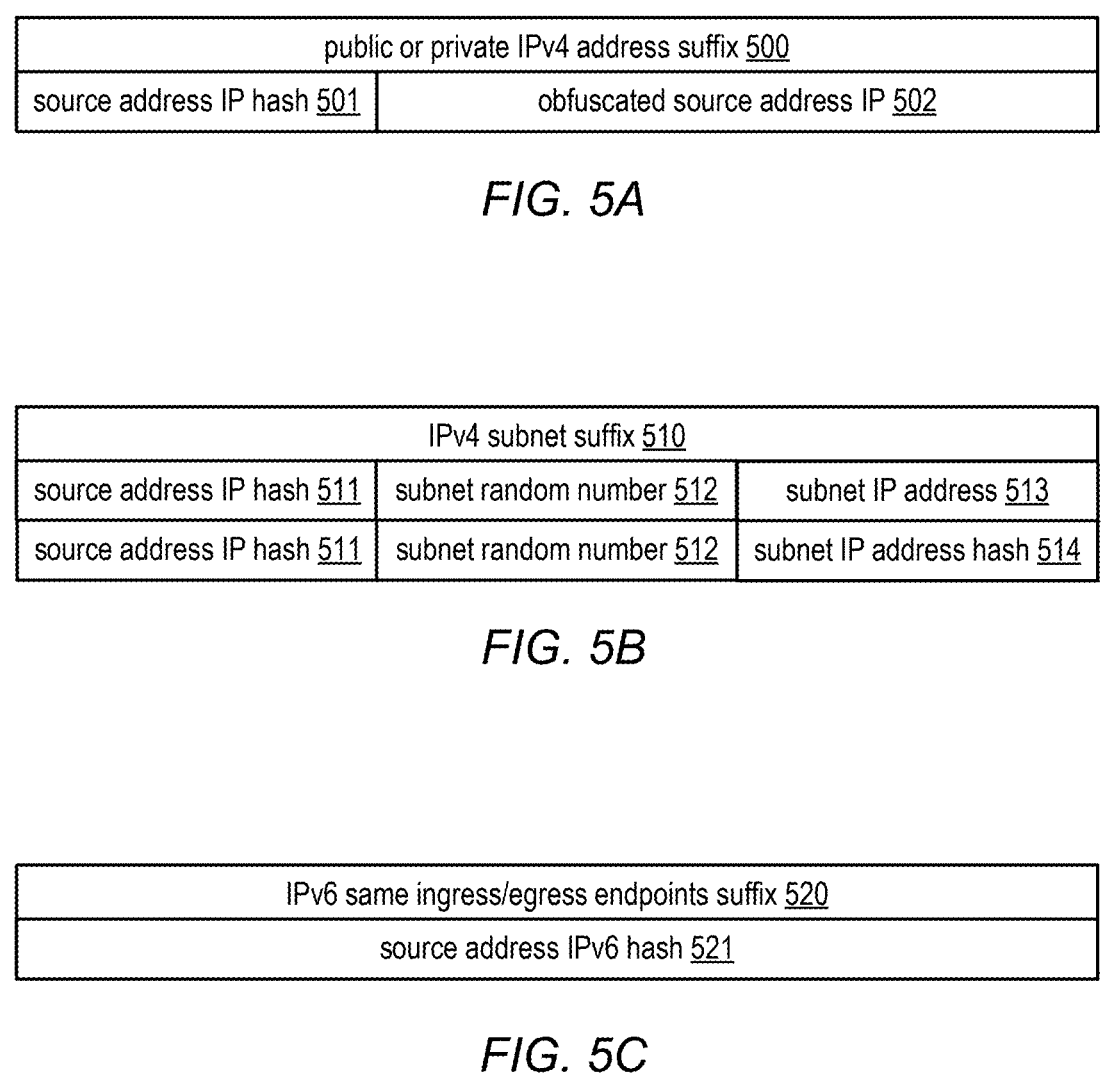

| public or private IPv4 address suffix 500 | |
|---|---|
| source address IP hash 501 | obfuscated source address IP 502 |

FIG. 5A

| IPv4 subnet suffix 510 | | |
|---|---|---|
| source address IP hash 511 | subnet random number 512 | subnet IP address 513 |
| source address IP hash 511 | subnet random number 512 | subnet IP address hash 514 |

FIG. 5B

| IPv6 same ingress/egress endpoints suffix 520 |
|---|
| source address IPv6 hash 521 |

FIG. 5C

MAINTAINING ISOLATION OF CLIENTS OF A SERVICE WITH CONNECTIONLESS PROTOCOLS

BACKGROUND

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each virtual machine being a software simulation acting as a distinct logical computing system that provides users with the illusion that they are the sole operators and administrators of a given hardware computing resource, which also provides application isolation and security among the various virtual machines. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Virtualization technologies have given rise to provider networks, which offer various services or resources to customers via public and private networks. Communication over these networks may employ both connection-oriented and connectionless protocols. While connections within provider networks for connectionless protocols may be created as needed, these connections cannot be maintained indefinitely due to limited resources, and resources reclaimed from retired connections may be reused to create new connections, yet because connections are not explicitly maintained in connectionless protocols, retiring of such connections may occur before packets of connectionless flows have ceased. If resources of such a flow are reused in a new flow, the result may be packets routed to a wrong destination leading to isolation violations between clients of the service.

BRIEF DESCRIPTION OF THE DRAWINGS

FIG. 3 is logical block diagram illustrating a route table of a routing device supporting dynamic routing of connectionless data packets, according to some embodiments.

FIG. 4 is logical block diagram illustrating an intermediate routing address for a routing device supporting dynamic routing of connectionless data packets, according to some embodiments.

FIG. 5A is a logical block diagram illustrating a source-specific suffix of an intermediate routing address for a routing device supporting dynamic routing of connectionless data packets, the suffix supporting public or private Internet Protocol Version Four endpoints, according to some embodiments.

FIG. 5B is a logical block diagram illustrating a source-specific suffix of an intermediate routing address for a routing device supporting dynamic routing of connectionless data packets, the suffix supporting Internet Protocol Version Four subnets, according to some embodiments.

FIG. 5C is a logical block diagram illustrating a source-specific suffix of an intermediate routing address for a routing device supporting dynamic routing of connectionless data packets, the suffix supporting public or private Internet Protocol Version Six endpoints, according to some embodiments.

Figure 1:
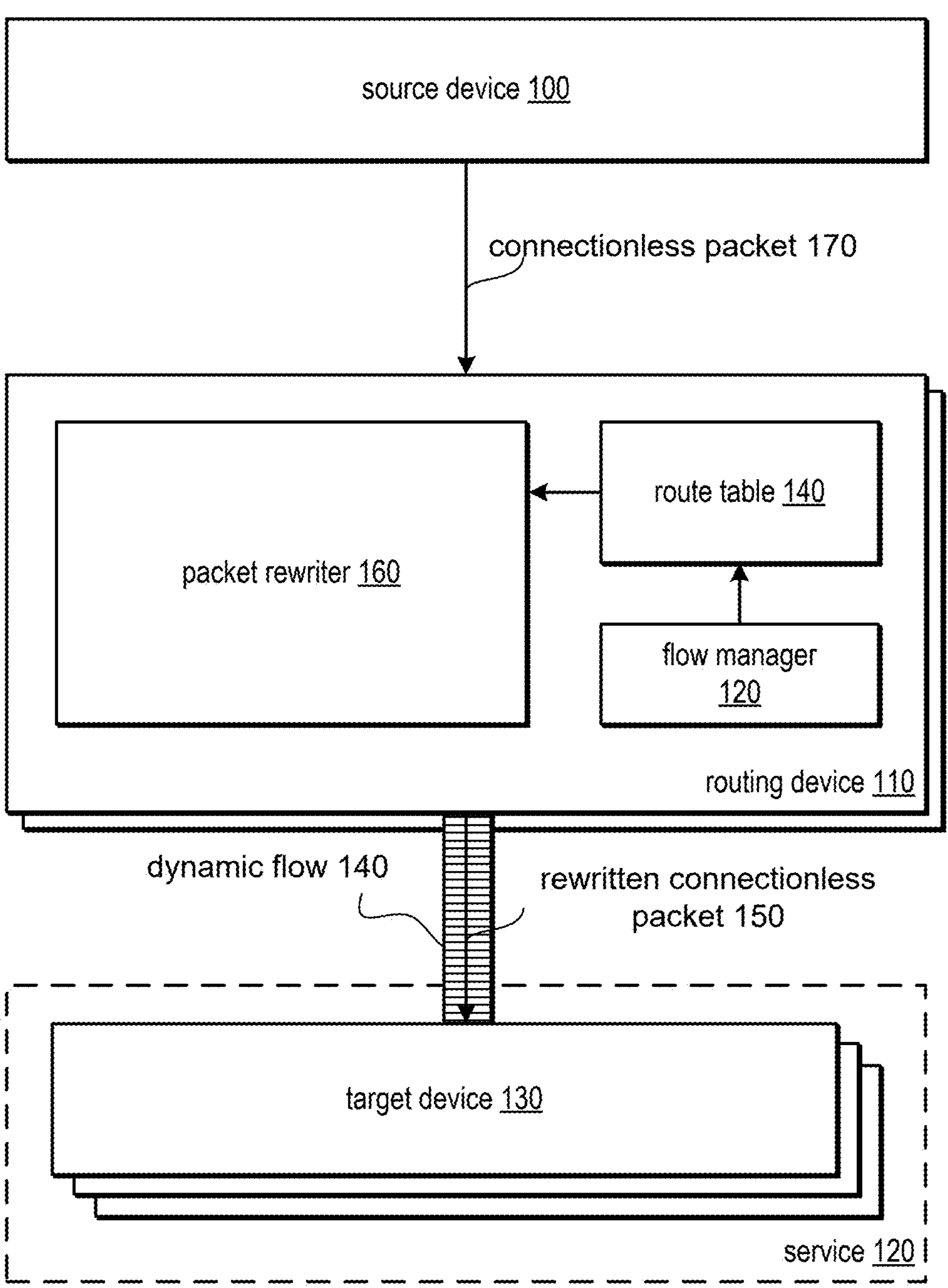
FIG. 1 is a logical block diagram of a routing device supporting dynamic routing of connectionless data packets, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Many enterprises and organizations rely on private network connections to securely access services and applications hosted remotely. However, supporting connectionless protocols like UDP over these private links poses significant challenges in maintaining proper network isolation between different clients. If a network load balancer or routing component temporarily mixes up client connections, it can lead to serious security vulnerabilities by misrouting responses intended for one client to a different unauthorized client. This misrouting issue is especially problematic for UDP due to its connectionless nature.

The above challenges, among others, are addressed by the presently disclosed solution to enable secure UDP support over private network links while maintaining strong isolation between clients. The systems and techniques of the present disclosure are able to accomplish this via algorithmically deriving a unique IPv6 address for each individual client flow connecting through a private link endpoint or public IP address. This unique IPv6 address can be computed based on the client's IP address, a random endpoint identifier, and/or part of an allocated IPv6 prefix range, for example. By leveraging the vast IPv6 address space, the systems and techniques of the present disclosure can isolate each client flow instead of relying on port multiplexing which can lead to misrouting issues. In this way, servers can directly respond to the derived IPv6 addresses without placement restrictions, eliminating misrouting risks while enabling UDP services over private links.

Virtualization technologies have provided benefits with respect to managing large-scale computing resources for customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each virtual machine being a software simulation acting as a distinct logical computing system that provides users with the illusion that they are the sole operators and administrators of a given hardware computing resource, which also provides application isolation and security among the various virtual machines. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Communication with these resources may employ both connection-oriented and connectionless protocols. While connections within resource networks for connectionless protocols may be created as needed, these connections cannot be maintained indefinitely due to limited networking resources, and networking esources reclaimed from retired connections may be reused to create new connections, yet because connections are not explicitly maintained in connectionless protocols, retiring of such connections may occur before packets of connectionless flows have ceased. If resources of such a flow are reused in a new flow, the result may be packets routed to a wrong destination leading to isolation violations between clients of the resources.

Systems and methods for configuring a routing device to support routing of connectionless packets are described. Upon receiving a connectionless packet, the routing device establishes a flow between the packet source and a target device for a virtual target address. After a period of inactivity in the flow, the flow is removed. To establish the flow, the routing device constructs an intermediate address for the routing device including a prefix for the routing device and an identifier based on the source address, then creates entries in a routing table to support routing of connectionless packets of the flow. The identifier uniquely associates the intermediate address of the particular flow to the source address such that the intermediate address cannot be reused in a future flow established for a difference source. Thus, late-arriving packets of the flow received after removal of the flow cannot be routed to an incorrect target address.

FIG. 1 is a logical block diagram of a routing device supporting dynamic routing of connectionless data packets, according to some embodiments. One or more routing devices 110 may provide routing services for various source devices such as the source device 100 to access computing services such as the service 120, in various embodiments. In some embodiments, the service 120 may be implemented using a target device 130 while in other embodiments the service 120 may be implemented as a distributed service using multiple target devices 130. Furthermore, the service 120 may be in some embodiments be one of multiple services of a provider network, as discussed in greater detail below in FIGS. 8 and 10 and the routing device(s) 110 may providing routing for multiple ones of these various services. In some embodiments, multiple routing devices may be incorporated in a distributed router or routing service, with packet ingress and egress function for some packets handle by different ones of the various routing devices. Finally, it should be understood that the routing devices 110 may describe any number of devices that provide the dynamic routing features described herein. For example, the routing device may be incorporated as part of a load-balancing system, distributed database system, and so forth. These examples are not intended to be limiting and any number of systems that provide the below described routing capabilities of the routing device 110 may be envisioned.

The source device 100, routing device 110 and target device 130 may communication using one or more network protocols including a connectionless protocol. An example of such a connectionless protocol may be the User Datagram Protocol (UDP), a protocol built on top of the Internet Protocol (IP), thus UDP is often referred to as UDP/IP. Unlike the Transmission Control Protocol/Internet Protocol (TCP/IP), a well-known connection-oriented protocol also based on IP, UDP/IP is connectionless and UDP packets may therefore be sent and received without establishing and maintaining connections. However, the lack of explicit connection establishment and teardown, provided in TCP/IP, forces the routing device to maintain routing information without knowing with certainty when data flows between devices are complete. Since packet routing requires allocation of finite resources, the routing device 110 must decide when to recover resources of established flows, giving rise to potential misrouting of UDP packets should associated flow resources be recovered and reallocated too quickly. Throughout the document below, UDP/IP is assumed as the connectionless protocol, although it should be understood that the systems and methods described herein are not restricted merely to UDP/IP but may be applied to other connectionless protocols with similar characteristics.

UDP communications are provided on top of IP, where IP uses a combination of an IP network address and an IP port number. IP ports are sixteen bit integer values, providing a limited number of simultaneous connections for a given IP address. Meanwhile, IP addresses are either thirty two bit or one hundred twenty eight bit values, corresponding to IP version four (IPv4) and IP version six (IPv6) respectively. While IPv4 addresses have a relatively limited address range, IPv6 addresses are relatively unlimited, a feature exploited in the systems and methods described herein. IP addresses are organized into routable groups known as subnets, where individual addresses with a subnet use a common portion of higher order IP address bits. The IP standard defines subnets with IPv4 and IPv6 which are routable and further defines particular IP ranges and IP addresses within subnets for particular purposes. These definitions of the IP standard are considered in the systems and methods described below.

When the source device 100 sends a first connectionless packet 170 targeting a virtual address of the service 120, the routing device 110 identifies the packet 130 as not having a routing entry in the route table 140. The route table 140 is discussed in further detail below in FIG. 3. Responsive to this identification, a flow manager 120 of the routing device 110 may establish a dynamic flow 140 for the connectionless packet 170 between the source device 100 and a target device 130 mapping to the virtual target address. This flow is established by creating an intermediate address, described in FIGS. 4 and 5A-5C below, creating routing entries for a route table 140 for the flow and rewriting the packet using packet rewriter 160. To rewrite the packet, the packet rewriter 160 at least replaces, in a header of the packet, a source address, currently containing and address of the source device 100, with the intermediate address and a target address, currently containing the virtual target address, with an address of the target device 130. Once the packet is rewritten, the routing device may send the rewritten connectionless packet 150 to the target device according to the dynamic flow 140. Subsequent connectionless packets of the flow, initiated by either the source device 100 or the target device 130, will be recognized using the created routing entries and routed to the proper destination.

However, as routing table entries, port numbers, and other resources are limited, the routing device cannot indefinitely maintain route table 140 entries for the established flow but must instead recover these resources to establish new flows. To accomplish this, the flow manager 120 may remove route table entries for a flow in response to a period of inactivity of the established flow. This period may be established to balance the need to recover routing resources with the likelihood that packets of the flow have ceased. However, should a flow be removed from the route table and resources be reassigned, the flow manager 120 must ensure that subsequent connectionless packets of the flow are not routed to an incorrect target.

Figures 2A, 2B, 2C, 2D:
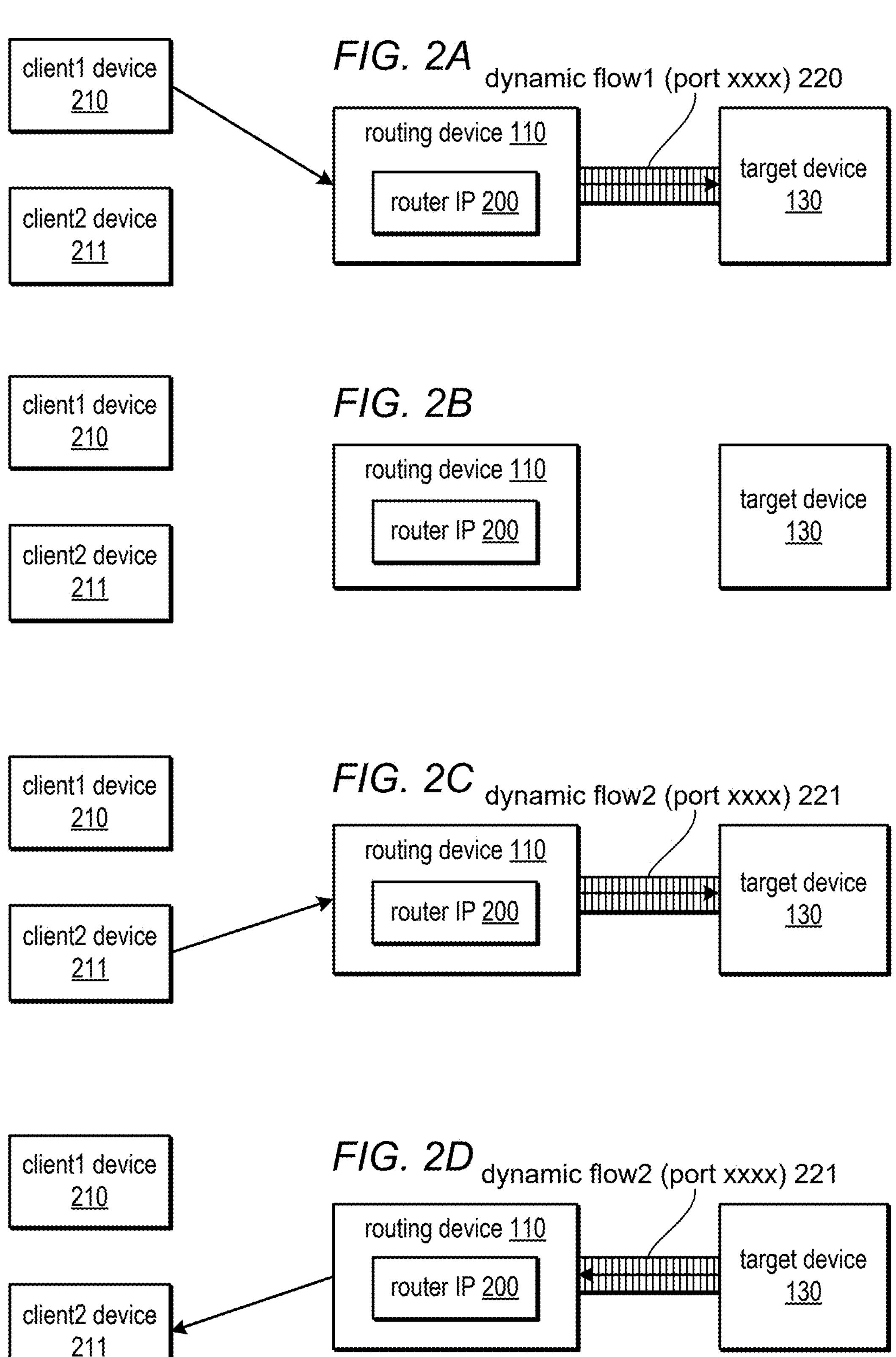
FIGS. 2A-2D are logical block diagrams illustrating conventional dynamic routing of connectionless data packets leading to misrouting of packets.

FIGS. 2A-2D are logical block diagrams illustrating conventional dynamic routing of connectionless data packets leading to misrouting of packets. FIG. 2A shows a client devices 210 and 211, where client1 device 210 sends a first connectionless packet 220 of a first flow to a virtual target address which is received at routing device 110. Routing device 110 then establishes a dynamic flow1 220 as described above in FIG. 1 by creating an intermediate address using a router IP 200 and a selected port, shown as "port xxxx" in the figure. Packets of the flow may then be exchanged between client 1 device 210 and target device 130 over dynamic flow1 220.

As shown in FIG. 2B, after a period of inactivity of dynamic flow1 220, the routing device removes routing information for dynamic flow1 220, eliminating the flow. Then, as shown in FIG. 2C, client2 device 211 sends a first connectionless packet 221 of a second flow to the virtual target address which is received at routing device 110. Routing device 110 then establishes a dynamic flow2 221 as described above in FIG. 1 by creating an intermediate address using a router IP 200 and the same selected port, shown as "port xxxx" in the figure. Packets of the flow may then be exchanged between client 2 device 211 and target device 130 over dynamic flow2 221.

Then, as shown in FIG. 2D, the target device sends a connectionless packet targeting the intermediate address composed of the router IP 200 and port xxxx. This packet is then received at routing device 110. As this packet corresponds to dynamic flow2 221, the routing device 110 will rewrite the packet and forward it as an additional packet 222 to client2 device 211, regardless of whether the target device 130 intends the packet for client2 device 211 or client1 device 210 as part of dynamic flow1 220 which has already been retired.

For many network-accessible services and applications, especially in virtualized computing environments, packet processing or transformation tasks (e.g., involving modifications of one or more packet headers) may have to be performed to route network packets between the resources involved in requesting operations and the resources involved in performing the requested operations. For example, in some scenarios the source network address and/or source port indicated in packets flowing from multiple traffic sources to a particular destination via an intermediary networking device may have to be substituted, so that the traffic in the reverse direction can be directed first to the intermediary network device from the destination, and then from the intermediary to the appropriate traffic source. Such types of transformation operations, which may in some cases require the selection of substitute port numbers, represent one example of network address translation (NAT).

A given packet flow may be distinguished from other packet flows based on an identifier generated from a tuple of packet properties in some embodiments, e.g., including (for a given direction of traffic between a pair of resources or endpoints) the source network address, the source port, the destination network address, the destination port, the networking protocol being used. In some cases, as described below in FIG. 8, the tuple may also include a unique identifier of a virtual network interface. Note that although a tuple comprising these elements are used as the example packet property combination used to distinguish flows from each other in much of this description, other combinations may be used in some embodiments—e.g., the virtual network interface ID may not necessarily be used in some embodiments, or other types of identifiers (such as identifiers of a client of a network function virtualization service on whose behalf the packets are transmitted) may be included in the packet property combination used for distinguishing flows. The techniques for consistent port allocation described herein may be used successfully in various embodiments in which the packet properties used to distinguish flows include at least the source and destination network addresses.

FIG. 3 is logical block diagram illustrating a route table of a routing device supporting dynamic routing of connectionless data packets, according to some embodiments. A route table 140 may include pairs of entries corresponding to various established flows, in some embodiments. Each entry may include a key 300 and a value 310, where the key 300 is used to match a tuple generated from a received packet and the value 310 for a matched key is used to rewrite the received packet for forwarding. A first entry of a pair of entries may include a key that includes a tuple associated with a source device and virtual target address while a second entry of a pair of entries may include a key that includes a tuple associated with a target device and the intermediate address of the routing devices. These various addresses may be network socket addresses that include both an IP address and a port number, where respective port numbers of the intermediate address and target address may be dynamically determined by a routing device.

FIG. 4 is logical block diagram illustrating an intermediate routing address for a routing device supporting dynamic routing of connectionless data packets, according to some embodiments. As discussed above, for connectionless protocols based on IP, an intermediate routing address 400 may, in some embodiments, be a IPv6 that includes one hundred twenty eight bits. These bit may include a most significant number of bits that defined a routable IPv6 prefix assigned to a routing device. In some embodiments, this may include eighty most significant bits of an IPv6 address. Then, the intermediate IPv6 routing address 400 may include zero or more bits of address type flags 420 that enable the interpretation of the remaining bits of the intermediate IPv6 routing address 400. Finally, the remaining bits of the intermediate IPv6 routing address 400 may be used to implement a source-specific suffix 430, as described in further detail in FIGS. 5A-5C below. By including source-specific information in the intermediate IPv6 routing address 400, flows may use unique resources for routing to fundamentally prevent misrouting of packets through resource reuse. It should be understood that intermediate routing addresses based on IPv6 one hundred twenty eight bit address values are merely one example of intermediate addresses and other forms of intermediate addresses, such as IPv4 addresses, may be envisioned in other embodiments.

FIG. 5A is a logical block diagram illustrating a source-specific suffix of an intermediate routing address for a routing device supporting dynamic routing of connectionless data packets, the suffix supporting public or private Internet Protocol Version Four (IPv4) endpoints, according to some embodiments. Public and private IPv4 endpoints may have a thirty two bit IP address, where all thirty two bit are significant in the address. For Public and private IPv4 endpoints, a source-specific suffix that includes a source address IP hash 501 and the thirty-bit source address IP address may be used, in some embodiments. Additionally, the thirty-bit source address IP address may be obscured (502) or encrypted, in some embodiments.

FIG. 5B is a logical block diagram illustrating a source-specific suffix of an intermediate routing address for a routing device supporting dynamic routing of connectionless data packets, the suffix supporting Internet Protocol Version Four (IPv4) subnets, according to some embodiments. IPv4 subnets may use a subset of a thirty two bit IP address. For Public and private IPv4 endpoints, a source-specific suffix that includes a source address IP hash 511 and a IP subnet random number may be used. In addition, either entire source address IP subnet address 513 or a hash of the source address IP subnet address 514 may be used, in some embodiments, depending on the size of the client IP subnet address. Additionally, the thirty-bit source address IP address may be obscured or encrypted, in some embodiments.

FIG. 5C is a logical block diagram illustrating a source-specific suffix of an intermediate routing address for a routing device supporting dynamic routing of connectionless data packets, the suffix supporting public or private Internet Protocol Version Six (IPv6) endpoints, according to some embodiments. Public and private IPv6 endpoints may have a one hundred twenty eight bit IP address, which cannot be duplicated entirely within a source specific suffix. For IPv6 endpoints, a source-specific suffix that includes a source address IP hash 521, in some embodiments. It should be understood that source-specific suffixes as shown in FIGS. 5A-5C are merely examples of source-specific suffixes that preserve information about the source device originating a connectionless packet flow and are not intended to be limiting, any number of source-specific suffixes or variations of the above example suffixes may be used to form intermediate addresses as described herein.

Figure 6:
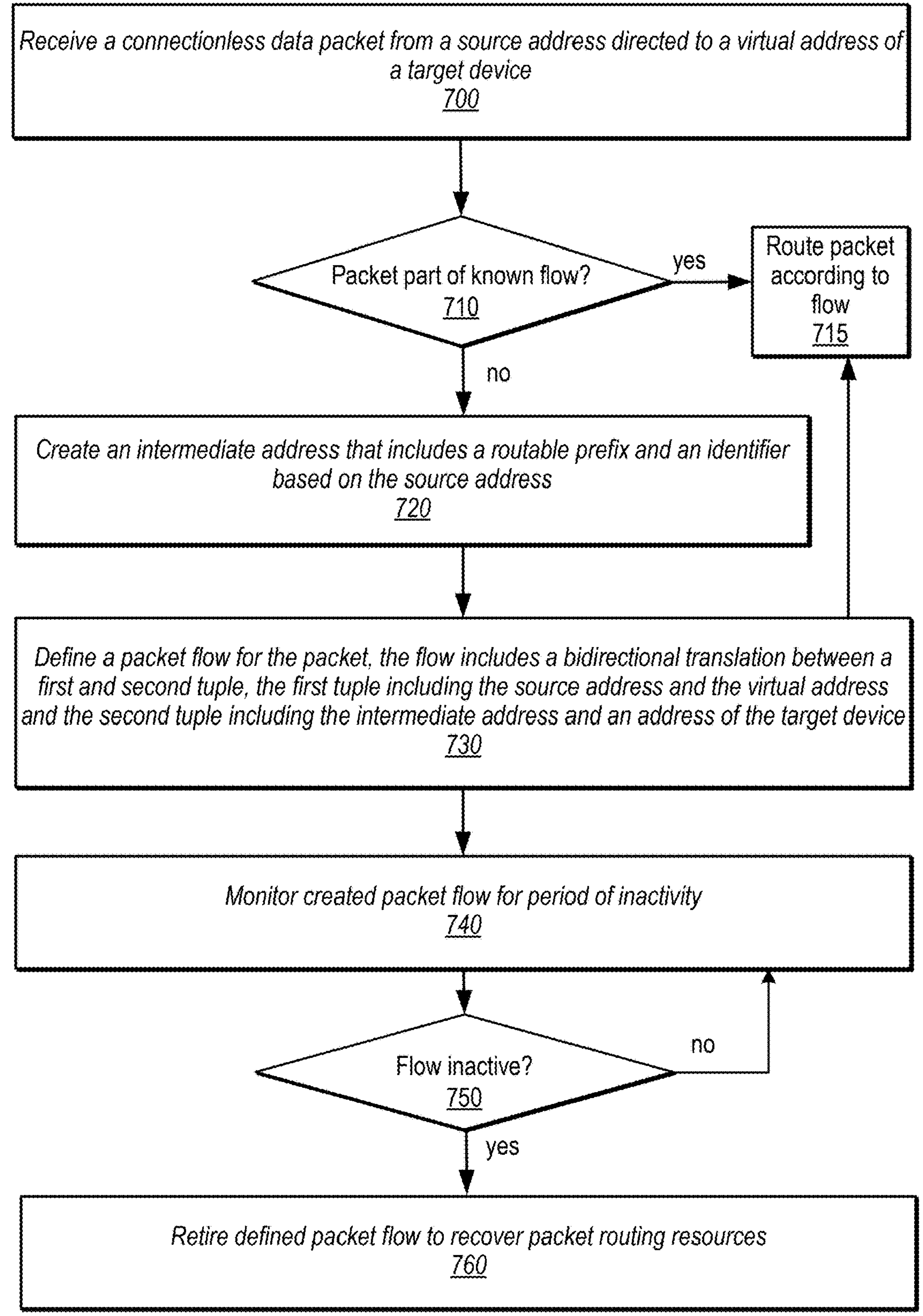
FIG. 6 is a high-level flow chart that illustrates various methods and techniques implementing a routing device supporting dynamic routing of connectionless data packets, according to various embodiments.

FIG. 6 is a high-level flow chart that illustrates various methods and techniques implementing a routing device supporting dynamic routing of connectionless data packets, according to various embodiments. The process begins at 700, where a data packet of a connectionless protocol is received from a source address and directed to a virtual address corresponding to a target device. First, as shown in 710, the received data packet is identified as being part of a known packet flow by forming a tuple that includes a source address and target virtual address for the packet and looking up the tuple in a translation or route table, such as the route table 140 of FIG. 1, in some embodiments. If the packet is found to be part of a known packet flow, as indicated by a positive exit from 710, the process proceeds to 715 where the packet is routed according to the identified packet flow. If the packet is not found to be part of a known packet flow, as indicated by a negative exit from 710, the process proceeds to 720.

As shown in 720, an intermediate address that includes a routable prefix and an identifier based on the source address of the packet may be created, in some embodiments. Examples of intermediate addresses are shown in FIGS. 4 and 5A-5C above. By including an identifier based on the source address in the intermediate address, misrouting of packets of the packet flow may be avoided in the case the packet flow is recovered prematurely.

As shown in 730, a packet flow for the packet may then be defined, in some embodiments. To create the packet flow, a first tuple and second tuple are created, the first tuple including the source address and the virtual address and the second tuple including the intermediate address. Entries in a route or translation table may then be created for the flow, the entries defining bidirectional routing between the first tuple and the second tuple.

The process may then route the packet according to the newly created flow, as shown in 715. In addition, as shown in 740, monitoring of the created packet flow may then be started to detect a period of inactivity. This period may be established to balance the need to recover routing resources with the likelihood that packets of the flow have ceased. An activity timeout may be established in a number of ways, in various embodiments. For example, a suitable timeout may be selected by the routing device 110 based on other functions, such as load balancing, provided by the routing device 110. In other embodiments, various clients operating client devices 210 and 210 may specify activity timeout based on client applications. These examples of activity timeouts are not intended to be limiting and any number of activity timeouts may be envisioned.

If flow inactivity is not detected, as shown in a negative exit from 750, the process returns to 740. If flow inactivity is detected, as shown in a positive exit from 750, the process advances to 760.

As shown in 760, the packet flow may then be retired by removing the bidirectional translation entries from the route or translation table. Retiring the packet flow allows for recovery of resources used for routing of future packet flows.

Figure 7:
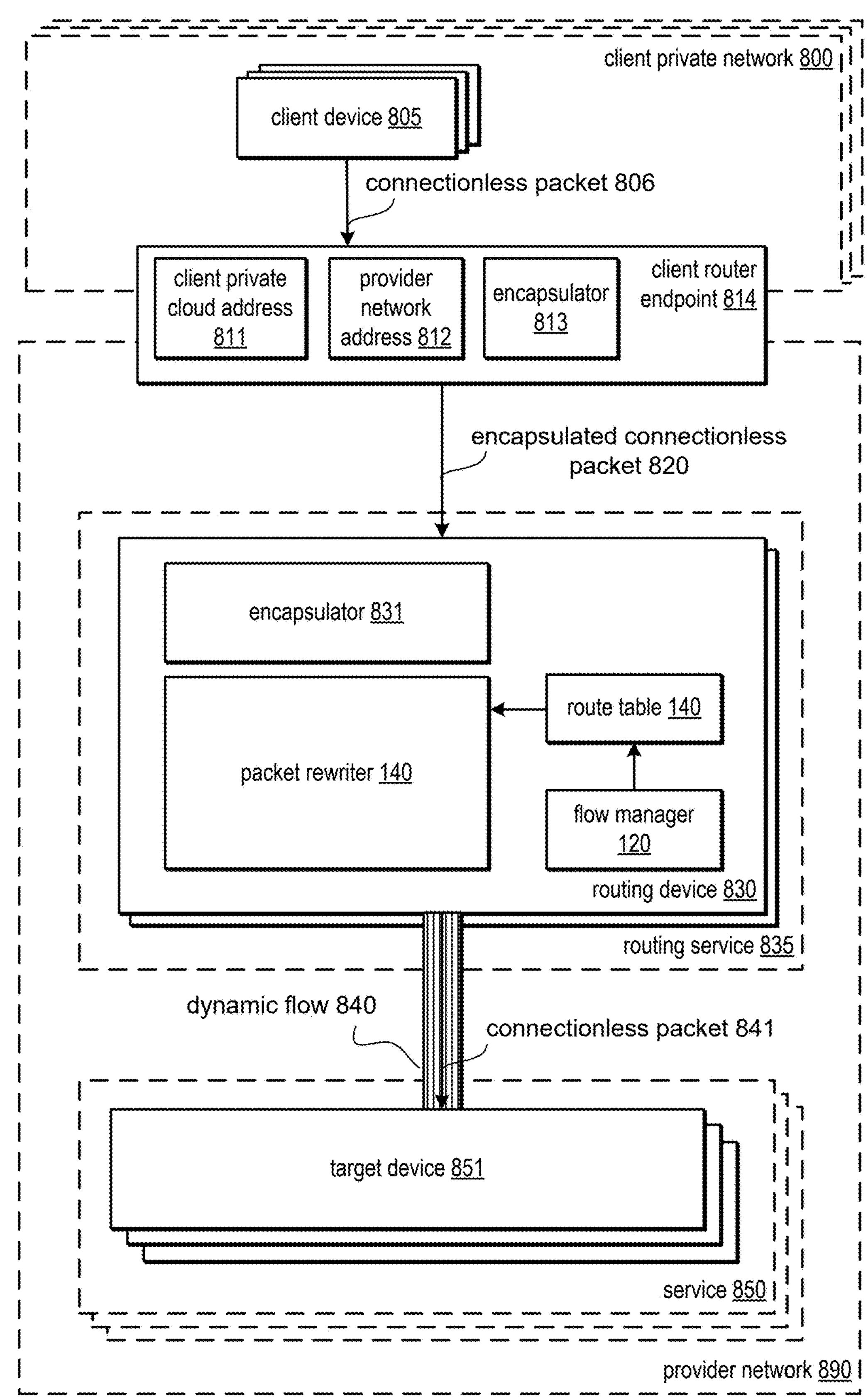
FIG. 7 is a logical block diagram of a routing service of a provider network supporting dynamic routing of connectionless data packets maintaining isolation of client private networks, according to some embodiments.

FIG. 7 is a logical block diagram of a routing service of a provider network supporting dynamic routing of connectionless data packets maintaining isolation of client private networks, according to some embodiments. Virtualization technologies have given rise to provider networks which offer various services or resources to customers via public and private networks. A provider network may implement a network to allow clients, operators, users, or other customers to use, access, operate, or otherwise control one or more computing resources hosted within the network, such as is discussed further below in FIG. 9. These resources may include various types of computing systems or devices that can communicate over the network in order to perform various tasks, operations, or services on behalf of the clients. For example, in some embodiments, a provider network may provide virtual computing resources to clients, users, or other type of customers, in the form of reserved compute instances (e.g., a virtual machine acting as a distinct logical computing system that provides users with the illusion that they are the sole operators and administrators of a given hardware computing resource). Customers of the provider network may reserve (e.g., purchase or buy) one or more compute resources (such as compute instances) or utilize other resources to perform various functions, services, techniques, and/or applications.

A provider network may offer client accounts (e.g., customers, users, operators, or other entities) client account-specific security features, in various embodiments. For example, a logically isolated network (which may also be referred to in some environments as a virtual private cloud or "VPC") may include a collection of computing and/or other resources in a logically isolated section of the provider network, over which the entity (e.g., user account) using the logically isolated network is granted substantial control with respect to networking configuration. In some embodiments, for example, a customer may select the network address ranges (e.g., Internet Protocol (IP) address ranges or blocks via Classless Inter-Domain Routing ("CIDR") notation) to be used for the logically isolated network resources, manage the creation of overlay networks, such as subnets within the logically isolated network, and the configuration of route tables, gateways, etc. for the logically isolated network.

A virtual private cloud (VPC) (also referred to as a virtual network (VNet), virtual private network, or virtual cloud network, in various implementations) is a custom-defined, virtual network within another network, such as a cloud provider network. A VPC can provide the foundational network layer for a cloud service, for example a compute cloud or an edge cloud, or for a customer application or workload that runs on the cloud. A VPC can be defined by at least its address space, internal structure (e.g., the computing resources that comprise the VPC, security groups), and transit paths.

A VPC is a virtual network dedicated to a particular customer account (or set of related customer accounts, such as different customer accounts belonging to the same business organization). A VPC is logically isolated from other virtual networks in the cloud. Customers can launch resources, such as compute instances, into a VPC. When creating a VPC, a customer can specify a range of IPv4 addresses for the VPC in the form of a Classless Inter-Domain Routing (CIDR) block. A VPC can span all of the availability zones in a particular region. After creating a VPC, a customer can add one or more subnets in each availability zone or edge location.

Subnets may offer client accounts of resources hosted in the subnet greater control to route network traffic among resources hosted within the subnet. For example, subnets may allow for the different types of network traffic to be diverted to different resources within the subnet in order to meet quality of service or other performance goals without requiring changes to the operation of substrate networks over or upon which the subnet is implemented, in some embodiments.

One or more routing devices 830 may provide a routing service 835 for various client devices 805 of a client provider network 800 through a client router endpoint 814 to access computing services, such as the service 850, of a provider network 890 in various embodiments. The routing service 835 may be implemented as a distributed service using multiple routing devices 830, where individual routing devices 830 may be implemented using one or more computer systems such as described below in FIG. 10. Further details on these services of the provider network are discussed below in FIG. 9. In some embodiments, service 850 may be implemented using a target device 851 while in other embodiments the service 850 may be implemented as a distributed service using multiple target devices 851, where individual target devices 851 may be implemented using one or more computer systems such as described below in FIG. 10. In some embodiments, multiple routing devices may be incorporated in a distributed router or routing service, with packet ingress and egress function for some packets handle by different ones of the various routing devices. Finally, it should be understood that the routing devices 830 may describe any number of devices that provide the dynamic routing features described herein. For example, the routing device may be incorporated as part of a load-balancing system, distributed database system, and so forth and these systems may be integrated into various services 850 of the provider network 890. These examples are not intended to be limiting and any number of systems that provide the below described routing capabilities of the routing device 830 may be envisioned.

Client devices 805, client router endpoint 814, routing device(s) 830 and target device(s) 851 may communication using one or more network protocols including a connectionless protocol. An example of such a connectionless protocol may be the User Datagram Protocol (UDP), a protocol built on top of the Internet Protocol (IP), thus UDP is often referred to as UDP/IP. Unlike the Transmission Control Protocol/Internet Protocol (TCP/IP), a well-known connection-oriented protocol also based on IP, UDP/IP is connectionless and UDP packets may therefore be sent and received without establishing and maintaining connections. However, the lack of explicit connection establishment and teardown, provided in TCP/IP, forces the routing device to maintain routing information without knowing with certainty when data flows between devices are complete. Since packet routing requires allocation of finite resources, the routing device 110 must decide when to recover resources of established flows, giving rise to potential misrouting of UDP packets should associated flow resources be recovered and reallocated too quickly. Throughout the document below, UDP/IP is assumed as the connectionless protocol, although it should be understood that the systems and methods described herein are not restricted merely to UDP/IP but may be applied to other connectionless protocols with similar characteristics.

UDP communications are provided on top of IP, where IP uses a combination of an IP network address and an IP port number. IP ports are sixteen bit integer values, providing a limited number of simultaneous connections for a given IP address. Meanwhile, IP addresses are either thirty two bit or one hundred twenty eight bit values, corresponding to IP version four (IPv4) and IP version six (IPv6) respectively. While IPv4 addresses have a relatively limited address range, IPv6 addresses are relatively unlimited, a feature exploited in the systems and methods described herein. IP addresses are organized into routable groups known as subnets, where individual addresses with a subnet use a common portion of higher order IP address bits. The IP standard defines subnets with IPv4 and IPv6 which are routable and further defines particular IP ranges and IP addresses within subnets for particular purposes. These definitions of the IP standard are considered in the systems and methods described below.

When a source device 805 of a client private network 800 or client private cloud sends a first connectionless packet 130 targeting a virtual address of the service 120, the packet is first received at a client router endpoint 814 within the client private cloud 800. The client router endpoint 814 includes a client private cloud address 811 for communicating within the client private network 800 and a provider network address 812 that enables communication with a provider network 890. The client router endpoint 814 then encapsulates the connectionless packet 130 to create an encapsulated connectionless packet 820 that is tagged with an identifier of the client private network 800 (generally, the client private cloud address 811). The encapsulated connectionless packet 820 may then be sent to the provider network 890 where the routing device 830 receives the encapsulated packet and decapsulates the packet while recording the identifier of the client private network 800. The identifier of the client private network 800 then becomes all or a portion of the source address of the decapsulated packet because, while the decapsulated packet identifies the source client device 805, client private network 800 may use an IP subnet address that is not unique with respect to other client private networks 800. The routing device 830 identifies the packet as not having a routing entry in the route table 140. The route table 140 is discussed in further detail above in FIG. 3. Responsive to this identification, a flow manager 120 of the routing device 830 may establish a dynamic flow 840 for the connectionless packet 806 between the source device 805 and a target device 851 mapping to the virtual target address. This flow is established by creating an intermediate address, described in FIGS. 4 and 5A-5C above, creating routing entries for a route table 140 for the flow and rewriting the packet using packet rewriter 160. To rewrite the packet, the packet rewriter 160 at least replaces, in a header of the packet, a source address, currently containing and address of the source device 100, with the intermediate address and a target address, currently containing the virtual target address, with an address of the target device 851. Once the packet is rewritten, the routing device may send the rewritten connectionless packet 841 to the target device according to the dynamic flow 840. Subsequent connectionless packets of the flow, initiated by either a client device or the target device 851, will be recognized using the created routing entries and routed to the proper destination.

However, as routing table entries, port numbers, and other resources are limited, the routing device cannot indefinitely maintain route table 140 entries for the established flow but must instead recover these resources to establish new flows. To accomplish this, the flow manager 120 may remove route table entries for a flow in response to a period of inactivity of the established flow. This period may be established to balance the need to recover routing resources with the likelihood that packets of the flow have ceased. An activity timeout may be established in a number of ways, in various embodiments. For example, a suitable timeout may be selected by the routing device 110 based on other functions, such as load balancing, provided by the routing device 110. In other embodiments, various clients operating client devices 210 and 210 may specify activity timeout based on client applications. These examples of activity timeouts are not intended to be limiting and any number of activity timeouts may be envisioned. Should a flow be removed from the route table and resources be reassigned, the flow manager 120 must ensure that subsequent connectionless packets of the flow are not routed to an incorrect target.

Figure 8:
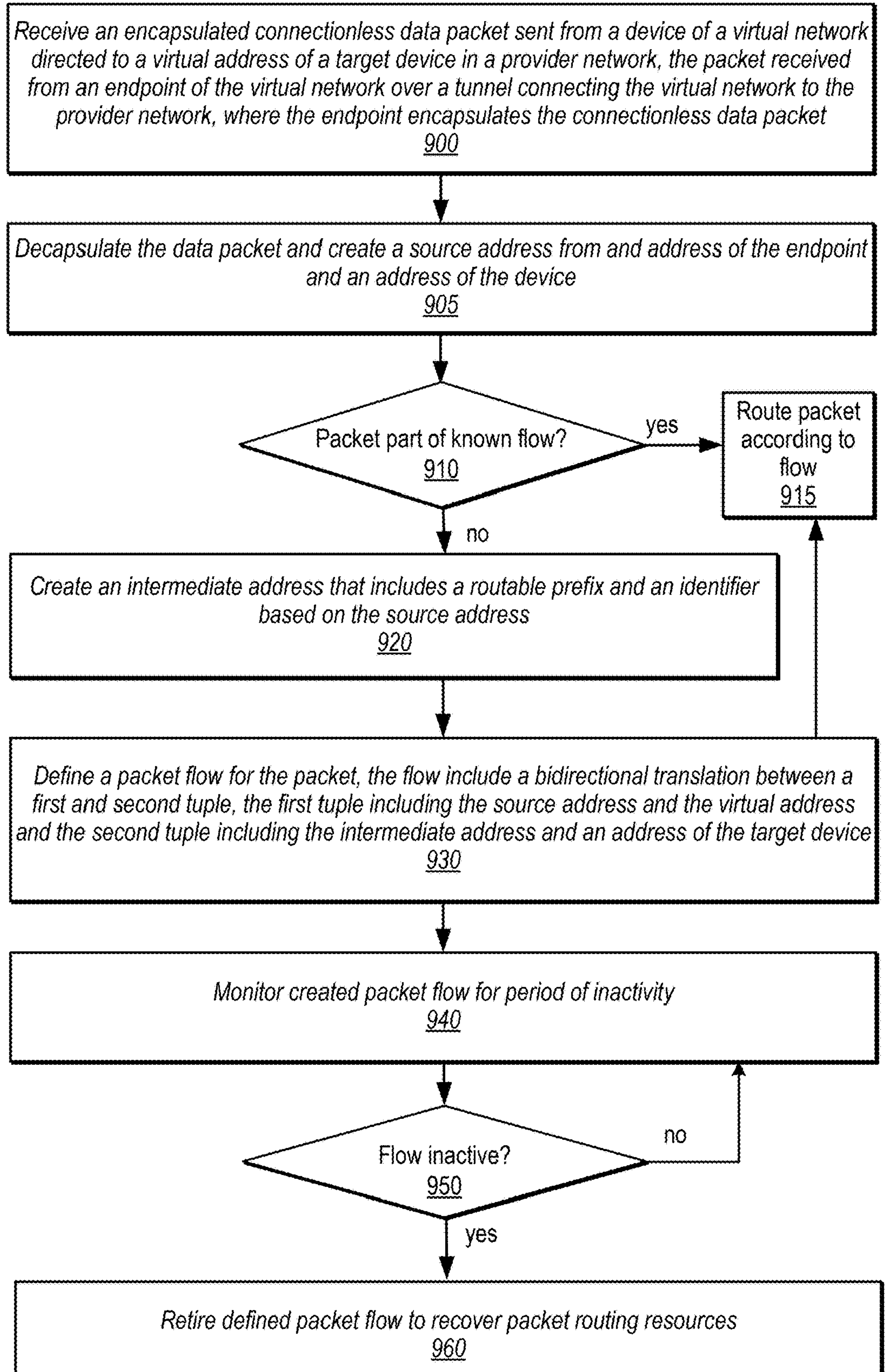
FIG. 8 is a high-level flow chart that illustrates various methods and techniques implementing a routing service of a provider network supporting dynamic routing of connectionless data packets, according to various embodiments.

FIG. 8 is a high-level flow chart that illustrates various methods and techniques implementing a routing service of a provider network supporting dynamic routing of connectionless data packets, according to various embodiments. The process begins at 900, where an encapsulated data packet of a connectionless protocol is received, the packet originated from a device if a virtual network and directed to a virtual address corresponding to a target device in a provider network. The packet is received from an endpoint that encapsulated the packet over a connection between the virtual network and the provider network, in some embodiments. First, as shown in 905, the data packet is decapsulated and an effective source address is created for the packet, the source address including the address of the endpoint and an address of the device. Then. as shown in 910, the received data packet is identified as being part of a known packet flow by forming a tuple that includes the source address and target virtual address for the packet and looking up the tuple in a translation or route table, such as the route table 140 of FIG. 1, in some embodiments. If the packet is found to be part of a known packet flow, as indicated by a positive exit from 910, the process proceeds to 915 where the packet is routed according to the identified packet flow. If the packet is not found to be part of a known packet flow, as indicated by a negative exit from 910, the process proceeds to 920.

As shown in 920, an intermediate address that includes a routable prefix and an identifier based on the source address of the packet may be created, in some embodiments. Examples of intermediate addresses are shown in FIGS. 4 and 5A-5C above. By including an identifier based on the source address in the intermediate address, misrouting of packets of the packet flow may be avoided in the case the packet flow is recovered prematurely.

As shown in 930, a packet flow for the packet may then be defined, in some embodiments. To create the packet flow, a first tuple and second tuple are created, the first tuple including the source address and the virtual address and the second tuple including the intermediate address. Entries in a route or translation table may then be created for the flow, the entries defining bidirectional routing between the first tuple and the second tuple.

The process may then route the packet according to the newly created flow, as shown in 915. In addition, as shown in 940, monitoring of the created packet flow may then be started to detect a period of inactivity. This period may be established to balance the need to recover routing resources with the likelihood that packets of the flow have ceased. An activity timeout may be established in a number of ways, in various embodiments. For example, a suitable timeout may be selected by the routing device 110 based on other functions, such as load balancing, provided by the routing device 110. In other embodiments, various clients operating client devices 210 and 210 may specify activity timeout based on client applications. These examples of activity timeouts are not intended to be limiting and any number of activity timeouts may be envisioned. If flow inactivity is not detected, as shown in a negative exit from 950, the process returns to 940. If flow inactivity is detected, as shown in a positive exit from 950, the process advances to 960.

As shown in 960, the packet flow may then be retired by removing the bidirectional translation entries from the route or translation table. Retiring the packet flow allows for recovery of resources used for routing of future packet flows.

Figure 9:
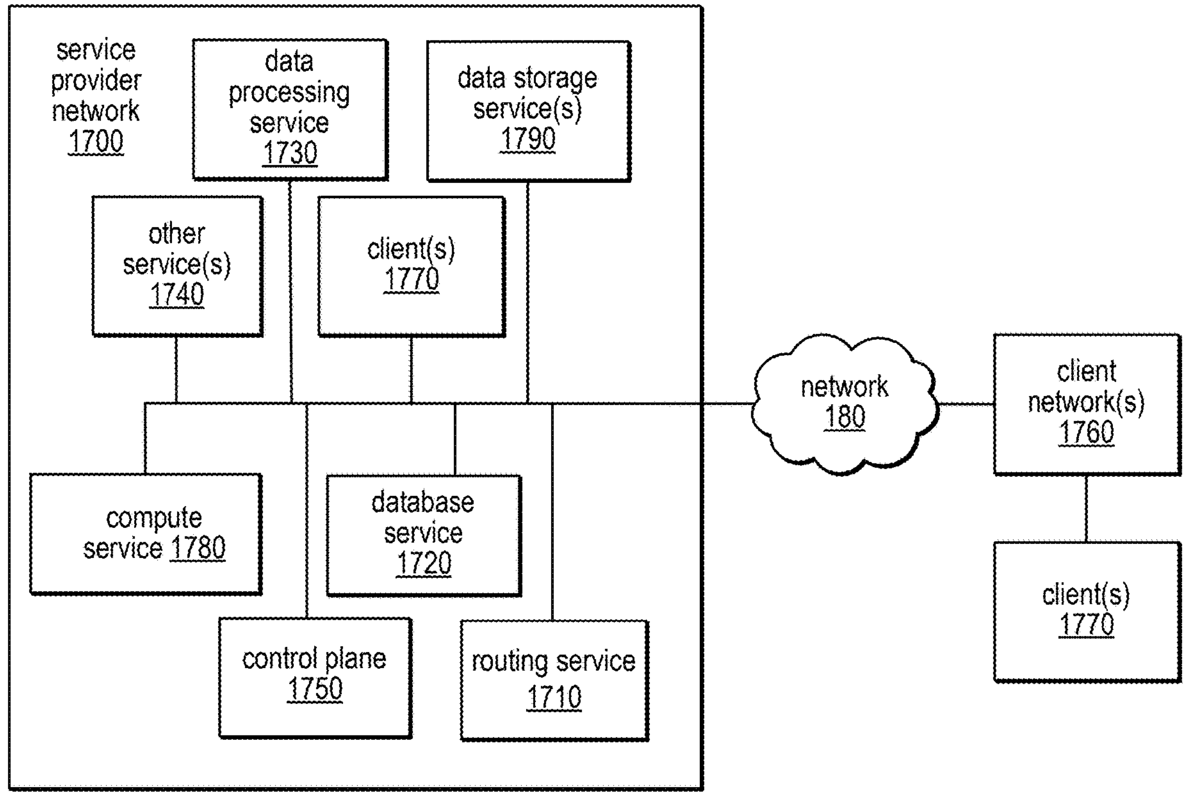
FIG. 9 illustrates an example provider network environment, according to at least some embodiments.

FIG. 9 illustrates an example provider network environment, according to at least some embodiments. Service provider network 1700 is illustrated as providing numerous services such as, but not limited to, a data processing service 1730, storage service(s) 1790 (e.g., data store, key-value store, short-term, long-term, or the like, etc.), database service 1720 (providing relational, non-relational database services, or both), compute service 1780 (e.g., providing virtual computing capabilities), a routing service 1710 and other services 1740, as well as clients 1770. Clients 1770 are illustrated as both external (communicably coupled via client networks 1760 and intermediate networks (e.g., the Internet or similar) to the service provider network) and internal to the service provider network. In some embodiments, one of the services of the service provider network may be a client of another one of the services.

Service provider network 1700 may be formed as a number of regions, where a region is a separate geographical area in which the cloud provider clusters data centers. Each region may include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone.

Preferably, availability zones within a region may be positioned far enough away from one other that the same natural disaster should not take more than one availability zone offline at the same time. Users may connect to availability zones of the service provider network 1700 via a publicly accessible network (e.g., the Internet, a cellular communication network). Regions are connected to a global network which includes private networking infrastructure (e.g., fiber connections controlled by the cloud provider) connecting each region to at least one other region. The service provider network 1700 may deliver content from points of presence outside of, but networked with, these regions by way of edge locations and regional edge cache servers. An edge location may be an extension of the cloud provider network outside of the traditional region/AZ context. For example an edge location may be a data center positioned to provide capacity to a set of customers within a certain latency requirement, a set of servers provided to a customer's premises, or a set of servers provided within (or forming part of) a cellular communications network, each of which may be controlled at least in part by the control plane of a nearby AZ or region. This compartmentalization and geographic distribution of computing hardware enables the service provider network 1700 to provide low-latency resource access to customers on a global scale with a high degree of fault tolerance and stability.

The traffic and operations of the cloud provider network may broadly be subdivided into two categories in various embodiments: control plane operations carried over a logical control plane 1750 and data plane operations carried over a logical data plane. While the data plane represents the movement of user data through the distributed computing system, the control plane 1750 represents the movement of control signals through the distributed computing system.

The control plane generally includes one or more control plane components distributed across and implemented by one or more control servers. Control plane traffic generally includes administrative operations, such as system configuration and management (e.g., resource placement, hardware capacity management, diagnostic monitoring, system state information).

The data plane includes customer resources that are implemented on the cloud provider network (e.g., compute instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, service provider network 1700 may include the hardware (e.g., modems, routers, switches, load balancers, proxy servers, etc.) and software (e.g., protocol stacks, accounting software, firewall/security software, etc.) necessary to establish a networking links between different components of service provider network 1700, such as computation and storage hosts, control plane components as well as external networks, such as network (e.g., the Internet). In some embodiments, service provider network 1700 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 1770 may be attached to the overlay network so that when a client provides an IP address that they want to send packets to, the IP address is run in virtual space by communicating with a mapping service that knows where the IP overlay addresses are.

Figure 10:
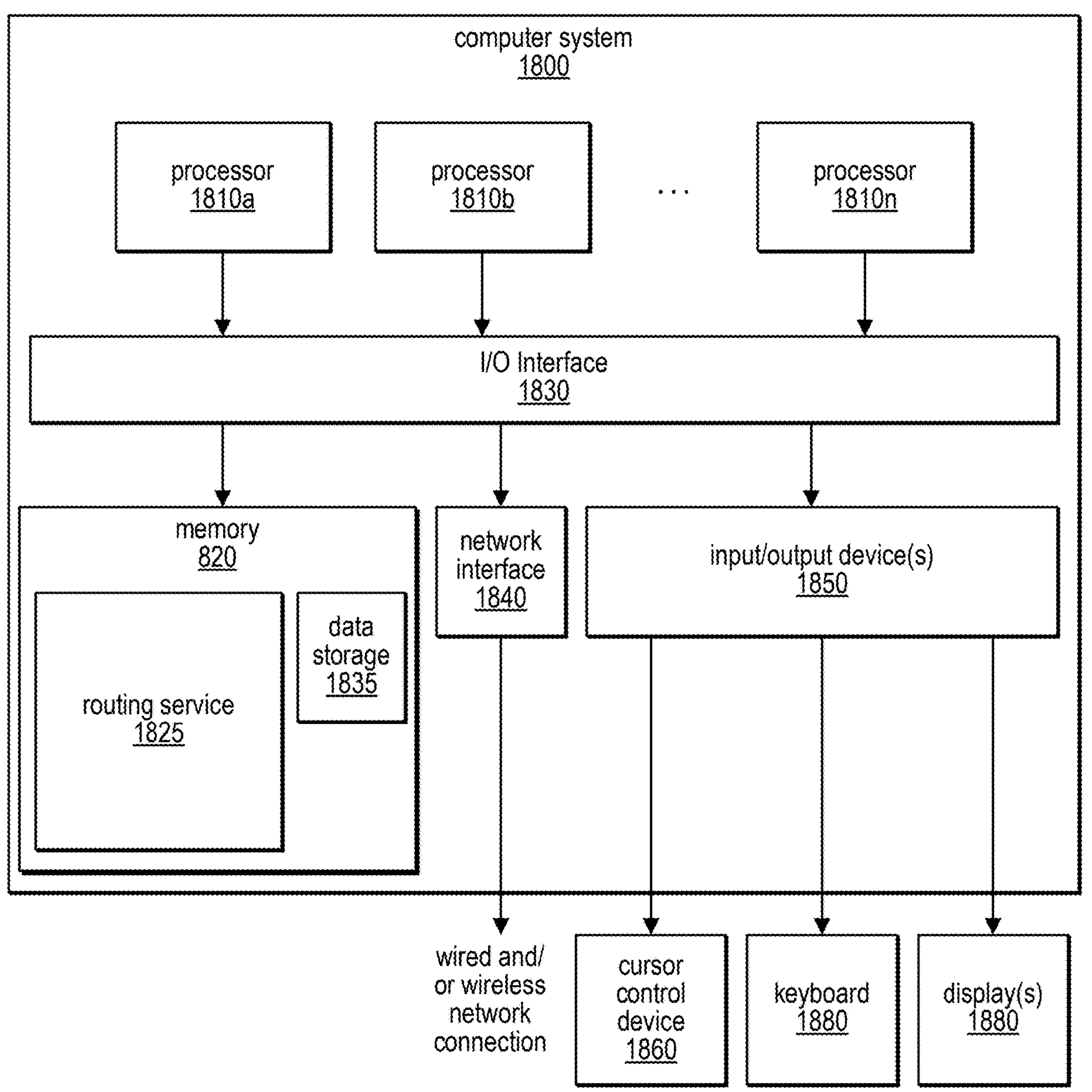
FIG. 10 is a block diagram illustrating an example computing system, according to some embodiments.

Any of various computer systems may be configured to implement processes associated with a technique for data processing as discussed with regard to the various figures above. FIG. 10 is a block diagram illustrating one embodiment of a computer system suitable for implementing some or all of the techniques and systems described herein. In some cases, a host computer system may host multiple virtual instances that implement the servers, request routers, storage services, control systems or client(s). However, the techniques described herein may be executed in any suitable computer environment (e.g., a cloud computing environment, as a network-based service, in an enterprise environment, etc.).

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors.

The program instructions may implement the functionality described herein (e.g., the functionality of the feature deployment service, other services, edge devices, models, compute logic, and any other components/devices that implement the techniques described herein). The various methods as illustrated in the figures and described herein represent example embodiments of methods. The order of any method may be changed, and various elements may be added, reordered, combined, omitted, modified, etc.

Embodiments to implement deploying feature processing units to implement data processing features at a provider network and edge devices as described herein may be executed on one or more computer systems, which may interact with various other systems or devices. One such computer system is illustrated by FIG. 10. In different embodiments, computer system 1800 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 1800 includes one or more processors 1810 coupled to a system memory 1820 via an input/output (I/O) interface 1830. Computer system 1800 further includes a network interface 1840 coupled to I/O interface 1830, and one or more input/output devices 1850, such as cursor control device 1860, keyboard 1870, and display(s) 1880. Display(s) may include standard computer monitor(s) and/or other display systems, technologies or devices, in one embodiment. In some embodiments, it is contemplated that embodiments may be implemented using a single instance of computer system 1800, while in other embodiments multiple such systems, or multiple nodes making up computer system 1800, may host different portions or instances of embodiments. For example, in one embodiment some elements may be implemented via one or more nodes of computer system 1800 that are distinct from those nodes implementing other elements.

In various embodiments, computer system 1800 may be a uniprocessor system including one processor 1810, or a multiprocessor system including several processors 1810 (e.g., two, four, eight, or another suitable number). Processors 1810 may be any suitable processor capable of executing instructions, in one embodiment. For example, in various embodiments, processors 1810 may be general-purpose or embedded processors implementing any of a variety of instruction set architectures (ISAs), such as the x86, PowerPC, SPARC, or MIPS ISAs, or any other suitable ISA. In multiprocessor systems, each of processors 1810 may commonly, but not necessarily, implement the same ISA.

In some embodiments, at least one processor 1810 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1820 may store program instructions 1825 implementing a routing service and/or data accessible by processor 1810, in one embodiment. In various embodiments, system memory 1820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., the feature deployment service, other services, edge devices, models, compute logic, and any other components/devices, etc.) are shown stored within system memory 1820 as program instructions 1825 and data storage 1835, respectively. In other embodiments, program instructions and/or data may be received, sent or stored upon different types of computer-accessible media or on similar media separate from system memory 1820 or computer system 1800.

A computer-accessible medium may include non-transitory storage media or memory media such as magnetic or optical media, e.g., disk or CD/DVD-ROM coupled to computer system 1800 via I/O interface 1830. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1840, in one embodiment.

In one embodiment, I/O interface 1830 may be coordinate I/O traffic between processor 1810, system memory 1820, and any peripheral devices in the device, including network interface 1840 or other peripheral interfaces, such as input/output devices 1850. In some embodiments, I/O interface 1830 may perform any necessary protocol, timing or other data transformations to convert data signals from one component (e.g., system memory 1820) into a format suitable for use by another component (e.g., processor 1810). In some embodiments, I/O interface 1830 may include support for devices attached through various types of peripheral buses, such as a variant of the Peripheral Component Interconnect (PCI) bus standard or the Universal Serial Bus (USB) standard, for example. In some embodiments, the function of I/O interface 1830 may be split into two or more separate components, such as a north bridge and a south bridge, for example. In addition, in some embodiments some or all of the functionality of I/O interface 1830, such as an interface to system memory 1820, may be incorporated directly into processor 1810.

Network interface 1840 may allow data to be exchanged between computer system 1800 and other devices attached to a network, such as other computer systems, or between nodes of computer system 1800, in one embodiment. In various embodiments, network interface 1840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1850 may, in some embodiments, include one or more display terminals, keyboards, keypads, touchpads, scanning devices, voice or optical recognition devices, or any other devices suitable for entering or retrieving data by one or more computer system 1800, in one embodiment. Multiple input/output devices 1850 may be present in computer system 1800 or may be distributed on various nodes of computer system 1800, in one embodiment. In some embodiments, similar input/output devices may be separate from computer system 1800 and may interact with one or more nodes of computer system 1800 through a wired or wireless connection, such as over network interface 1840.

As shown in FIG. 10, memory 1820 may include program instructions 1825 that implement the various embodiments of the systems as described herein, and data store 1835, comprising various data accessible by program instructions 1825, in one embodiment. In one embodiment, program instructions 1825 may include software elements of embodiments as described herein and as illustrated in the Figures. Data storage 1835 may include data that may be used in embodiments (e.g., models, functions, compute logic, metadata, etc.). In other embodiments, other or different software elements and data may be included.

Those skilled in the art will appreciate that computer system 1800 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device.

Computer system 1800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above.

In some embodiments, instructions stored on a computer-readable medium separate from computer system 1800 may be transmitted to computer system 1800 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

one or more processors; and a memory storing program instructions that, when executed on the one or more processors, implement a routing device configured to:

receive a data packet sent from a source address to a target address according to a connectionless protocol, wherein the target address is a virtual address of a target device of a provider network, wherein the data packet is sent from an endpoint that routes data packets to and from a client virtual private network to the provider network, wherein the endpoint encapsulates the data packet received from a client device within the client virtual private network, wherein the data packet comprises an address of the client device, wherein the encapsulation of the data packet identifies the endpoint, and wherein the source address comprises the identifier of the endpoint and the address of the client device; and establish a flow between the source address and the target device, wherein to establish the flow the routing device is configured to:

create an intermediate address comprising a routable prefix and an identifier based at least in part on the source address; and create a translation between a first tuple, comprising the source address and the virtual address, and a second tuple, comprising the intermediate address and a target address of the target device, to enable routing of connectionless packets including the data packets between the source address and target device; and route the connectionless packets between the source address and the target address.

2. The system of claim 1, wherein the routing device is further configured to:

remove the intermediate address and the translation between the first tuple and the second tuple response to a period of inactivity of the established route, and subsequent to the removing:

establish another route between another source address, different from the source address, and the target device, comprising creating another intermediate address comprising the routable prefix and another identifier based at least in part on the other source address, wherein the other identifier is different from the identifier;

receive, subsequent to establishing the other route, another data packet of the route according to the connectionless protocol; and route the other data packet between the source address and the target address.

3. The system of claim 1, wherein the intermediate address is an Internet Protocol version six (IPv6) address, wherein the source address is an Internet Protocol version four (IPv4) address, wherein the source address is an address of a virtual private cloud endpoint (VPCE), and wherein the intermediate address comprises a random number for the VPCE and an identifier based at least in part on a portion of the source address common to a plurality of endpoints of the virtual private cloud.

4. The system of claim 1, wherein the source address and the intermediate address are Internet Protocol version six (IPv6) addresses, wherein the source address is an address of a virtual private cloud endpoint (VPCE), and wherein the intermediate address comprises a random number for the VPCE and an identifier based at least in part on a portion of the source address common to a plurality of endpoints of the virtual private cloud.

5. A method, comprising:

performing, by a routing device:

receiving a data packet sent from a source address to a target address according to a connectionless protocol, wherein the target address is a virtual address of a target device of a provider network, and wherein the source address is part of a client virtual private network different from the provider network;

establishing a flow between the source address and the target device, comprising:

creating an intermediate address comprising a routable prefix and an identifier based at least in part on the source address; and creating a translation between a first tuple, comprising the source address and the virtual address, and a second tuple, comprising the intermediate address and a target address of the target device, to enable routing of connectionless packets including the data packets between the source address and target device; and routing the connectionless packets between the source address and the target address.

6. The method of claim 5, further comprising performing, by the routing device:

removing the intermediate address and the translation between the first tuple and the second tuple responsive to a period of inactivity of the established flow, and subsequent to the removing:

establishing another flow between another source address, different from the source address, and the target device, comprising creating another intermediate address comprising the routable prefix and another identifier based at least in part on the other source address, wherein the other identifier is different from the identifier.

7. The method of claim 6, further comprising performing, by the routing device:

receiving, subsequent to establishing the other flow, another data packet of the flow according to the connectionless protocol; and routing the other data packet between the source address and the target address.

8. The method of claim 5, wherein the intermediate address is an Internet Protocol version six (IPv6) address, wherein the source address is an Internet Protocol version four (IPv4) address, wherein the source address is an address of a virtual private cloud endpoint (VPCE), and wherein the intermediate address comprises a random number for the VPCE and an identifier based at least in part on a portion of the source address common to a plurality of endpoints of the virtual private cloud.

9. The method of claim 5, wherein the intermediate address is an Internet Protocol version six (IPv6) address, wherein the source address is an Internet Protocol version four (IPv4) address, and wherein the intermediate address comprises a hash of the source address and an identifier based at least in part on the source address.

10. The method of claim 5, wherein the source address and the intermediate address are Internet Protocol version six (IPv6) addresses, wherein the source address is an address of a virtual private cloud endpoint (VPCE), and wherein the intermediate address comprises a random number for the VPCE and an identifier based at least in part on a portion of the source address common to a plurality of endpoints of the virtual private cloud.

11. The method of claim 5, wherein the source address and the intermediate address are Internet Protocol version six (IPv6) addresses, and wherein the intermediate address comprises a hash of the source address.

12. The method of claim 5, wherein the source address and the intermediate address are Internet Protocol version six (IPv6) addresses, wherein the source address is a global universal address (GUA), and wherein the intermediate address and the source address are the same.

13. The method of claim 5, wherein the target device is a computing device providing a service of the provider network, wherein the routing device is part of a routing service of the provider network, wherein the data packet is sent from an endpoint that routes data packets to and from the client virtual private network to the provider network, and wherein the source address comprises at least an identifier of the endpoint.

14. The method of claim 13, wherein the endpoint encapsulates the data packet received from a client device within the client virtual private network, wherein the client device is different from the endpoint, wherein the data packet comprises an address of the client device, wherein the encapsulation of the data packet identifies the endpoint, and wherein the source address comprises the identifier of the endpoint and the address of the client device.

15. One or more non-transitory computer-accessible storage media storing program instructions that when executed on or across one or more computing devices cause the one or more computing devices to implement a routing device to perform:

receiving a data packet sent from a source address to a target address according to a connectionless protocol, wherein the target address is a virtual address of a target device of a provider network, and wherein the source address is part of a client virtual private network different from the provider network; and establishing a route between the source address and the target device, comprising:

creating an intermediate address comprising a routable prefix and an identifier based at least in part on the source address; and creating a translation between a first tuple, comprising the source address and the virtual address, and a second tuple, comprising the intermediate address and a target address of the target device, to enable routing of connectionless packets including the data packets between the source address and target device; and routing the connectionless packets between the source address and the target address.

16. The one or more non-transitory computer-accessible storage media of claim 15, the routing device further performing:

removing the intermediate address and the translation between the first tuple and the second tuple response to a period of inactivity of the established route, and subsequent to the removing:

establishing another route between another source address, different from the source address, and the target device, comprising creating another intermediate address comprising the routable prefix and another identifier based at least in part on the other source address, wherein the other identifier is different from the identifier;

receiving, subsequent to establishing the other route, another data packet of the route according to the connectionless protocol; and routing the other data packet between the source address and the target address.

17. The one or more non-transitory computer-accessible storage media of claim 15, wherein the intermediate address is an Internet Protocol version six (IPv6) address, wherein the source address is an Internet Protocol version four (IPv4) address, wherein the source address is an address of a virtual private cloud endpoint (VPCE), and wherein the intermediate address comprises a random number for the VPCE and an identifier based at least in part on a portion of the source address common to a plurality of endpoints of the virtual private cloud.

18. The one or more non-transitory computer-accessible storage media of claim 15, wherein the intermediate address is an Internet Protocol version six (IPv6) address, wherein the source address is an Internet Protocol version four (IPv4) address, and wherein the intermediate address comprises a hash of the source address and an identifier based at least in part on the source address.

19. The one or more non-transitory computer-accessible storage media of claim 15, wherein the source address and the intermediate address are Internet Protocol version six (IPv6) addresses, and wherein the intermediate address comprises a hash of the source address.

20. The one or more non-transitory computer-accessible storage media of claim 13, wherein the target device is a computing device providing a service of the provider network, wherein the routing device is part of a routing service of the provider network, wherein the data packet is sent from an endpoint that routes data packets to and from the client virtual private network to the provider network, wherein the endpoint encapsulates the data packet received from a client device within the client virtual private network, wherein the client device is different from the endpoint, wherein the data packet comprises an address of the client device, wherein the encapsulation of the data packet identifies the endpoint, and wherein the source address comprises the identifier of the endpoint and the address of the client device.

* * * * *